United States Patent [19]
Kortan et al.

[11] Patent Number: 5,560,759
[45] Date of Patent: Oct. 1, 1996

[54] CORE INSERTION METHOD FOR MAKING OPTICAL FIBER PREFORMS AND OPTICAL FIBERS FABRICATED THEREFROM

[75] Inventors: Ahmet R. Kortan, Somerset, N.J.; Robert M. Pafchek, Gwinett, Ga.

[73] Assignee: Lucent Technologies Inc., Murray Hill, N.J.

[21] Appl. No.: 338,926

[22] Filed: Nov. 14, 1994

[51] Int. Cl.$^6$ ................................................. C03B 37/012
[52] U.S. Cl. ............................ 65/388; 65/404; 65/412; 65/389
[58] Field of Search ............................ 65/388, 389, 404, 65/412

[56] References Cited

U.S. PATENT DOCUMENTS

| | | |
|---|---|---|
| 4,729,777 | 3/1988 | Mimura ................................. 65/388 |
| 4,793,842 | 12/1988 | Yokota et al. . |
| 4,944,783 | 7/1990 | Hongo et al. . |
| 5,106,400 | 4/1992 | Tick . |
| 5,143,513 | 9/1992 | Kramer ................................. 65/406 |
| 5,160,521 | 11/1992 | Tran . |
| 5,215,564 | 6/1993 | Weber . |
| 5,285,518 | 2/1994 | Elyamani et al. . |
| 5,308,371 | 5/1994 | Kawamoto et al. . |

FOREIGN PATENT DOCUMENTS 61-20908  1/1986  Japan ........................................ 65/388

OTHER PUBLICATIONS

Ohishi et al., Fabrication of Fluoride Glass Single–Mode Fibers, Journal of Lightwave Technology, vol. LT–2, No. 5, pp. 592–595 (1984).
Mitachi et al., Fluoride–Glass–Cladded Optical Fibres For Mid–Infra–Red Ray Transmission, Electronics Letters, vol. 17, No. 17, pp. 591–592.
Aggarwal et al., Fluoride Glass Fiber Optics, Academic Press, Inc., pp. 213–233 (1991).
France et al., Fluoride Glass Optical Fibres, Blackie and Son Ltd., pp. 101–121 (1990).
Tran et al., Fuoride Glass Preforms Prepared by a Rotational Casting Process, Electronics Letters, vol. 18, pp. 657–658 (1982).

Primary Examiner—David A. Simmons
Assistant Examiner—John Hoffmann

[57] ABSTRACT

A method and apparatus are provided for forming a glass preform which can be directly drawn into a single or multi-mode optical fiber. Single or multi-mode fibers drawn from the preforms described herein have high quality core-clad interfaces since the core and cladding materials are not exposed to crystallization temperatures upon the addition of the core material to cladding material.

21 Claims, 4 Drawing Sheets

CORE INSERTION METHOD FOR MAKING OPTICAL FIBER PREFORMS AND OPTICAL FIBERS FABRICATED THEREFROM

BACKGROUND OF THE INVENTION

1. Field of the Invention

The present invention relates generally to optical fibers. Specifically, the invention relates to a novel method for insertion of core material into a cladding material to form an optical fiber preform having a high quality core-clad interface for use in fabricating a low loss optical fiber.

2. Description of the Related Art

Single mode optical fibers that transmit both visible and infrared energy are desirable for use in long distance communications systems. Minimization of transmission loss is particularly important in preparing optical fibers for use in long distance applications. Conventional methods for fabricating optical fibers involve casting glass melts into glass preforms which are then drawn into optical fibers. Optical fibers drawn from glass preforms having crystallites and bubbles, particularly at the core-clad interface, exhibit undesirable scattering loss and reduced transmission capabilities. Preforms prepared from heavy metal fluoride glasses are particularly susceptible to crystallite formation upon exposure of the glasses to temperatures at or above crystallization temperatures.

Conventional methods for casting optical fiber preforms expose the core and cladding materials to temperatures exceeding crystallization temperatures during the addition of the core material to the cladding material. These methods involve cooling a cladding glass melt and a subsequent reheating of the cladding glass to temperatures greater than the crystallization temperature upon the addition of a core glass melt to the cladding glass. Suction casting is a conventional preform casting method wherein cladding glass is poured into a preheated mold having a reservoir at the lower end. As the cladding glass cools to the glass transition temperature, a large thermal contraction occurs which constricts the cladding glass volume in the reservoir thereby forming a cylindrical cladding tube in the mold. A core glass melt is poured onto the cladding glass and is drawn through the cladding tube by a suction effect. The temperature of the core glass melt at the time it is poured onto the cladding glass is typically at least about 300° C. above the crystallization temperature which reheats the cladding glass at the core-clad interface to temperatures above the crystallization temperature. Thus, this method like other conventional casting methods results in the formation of undesirable crystallites at the core-clad interface. Suction casting and other conventional methods such as, build-in casting, rotational casting, and rod-in-tube casting for making optical fiber preforms are described in chapter 5 of *Fluoride Glass Fiber Optics,* Academic Press, Inc., edited by Ishivar D. Aggarwal and Grant Lu, pp. 223–227 (1991). See also, for example, U.S. Pat. Nos. 4,793,842, 5,106,400 and 5,160, 521.

Preforms cast by conventional methods must be modified before being drawn into single mode fibers having desired core and cladding diameters. Examples of such modifications include stretching procedures at temperatures which further increase crystallite formation and multiple jacketing procedures. Casting methods which require pouring of a core melt into a cladding melt also result in the formation of undesirable air bubbles at the core of the preform.

SUMMARY OF THE INVENTION

A novel core insertion technique is provided for casting preforms from which optical fibers may be directly drawn. Optical fibers including multi-mode and single mode fibers having desirable fiber diameters and core-clad ratios, may be directly drawn from the preforms described herein without the need for additional modifications of the preforms. A casting method is also described herein which provides preforms having high quality core-clad interfaces since neither the core material nor the cladding material are exposed to crystallization temperatures during the core insertion procedure. The core insertion method of the present invention is useful for fabricating single mode fibers suitable for use in long distance communications systems since the reduction of scattering loss in the preforms herein allows for fabrication of optical fibers having longer repeaterless distances.

In one aspect, single mode heavy metal fluoride optical fibers are drawn directly frown the preforms cast in accordance with the method described herein.

In another aspect, an apparatus for casting the preforms of the present invention is provided wherein a previously fabricated core fiber having a temperature of about room temperature is inserted into cladding material at a time when the temperature of the inner portion of the cladding material is below the crystallization temperature and above the glass transition temperature. Upon insertion, the temperature of the core fiber increases somewhat above the glass transition temperature but does not reach the crystallization temperature. In accordance with the method described herein, the temperature of the cladding material does not increase during insertion of the core fiber.

DETAILED DESCRIPTION OF PREFERRED EMBODIMENTS

Figure 1:
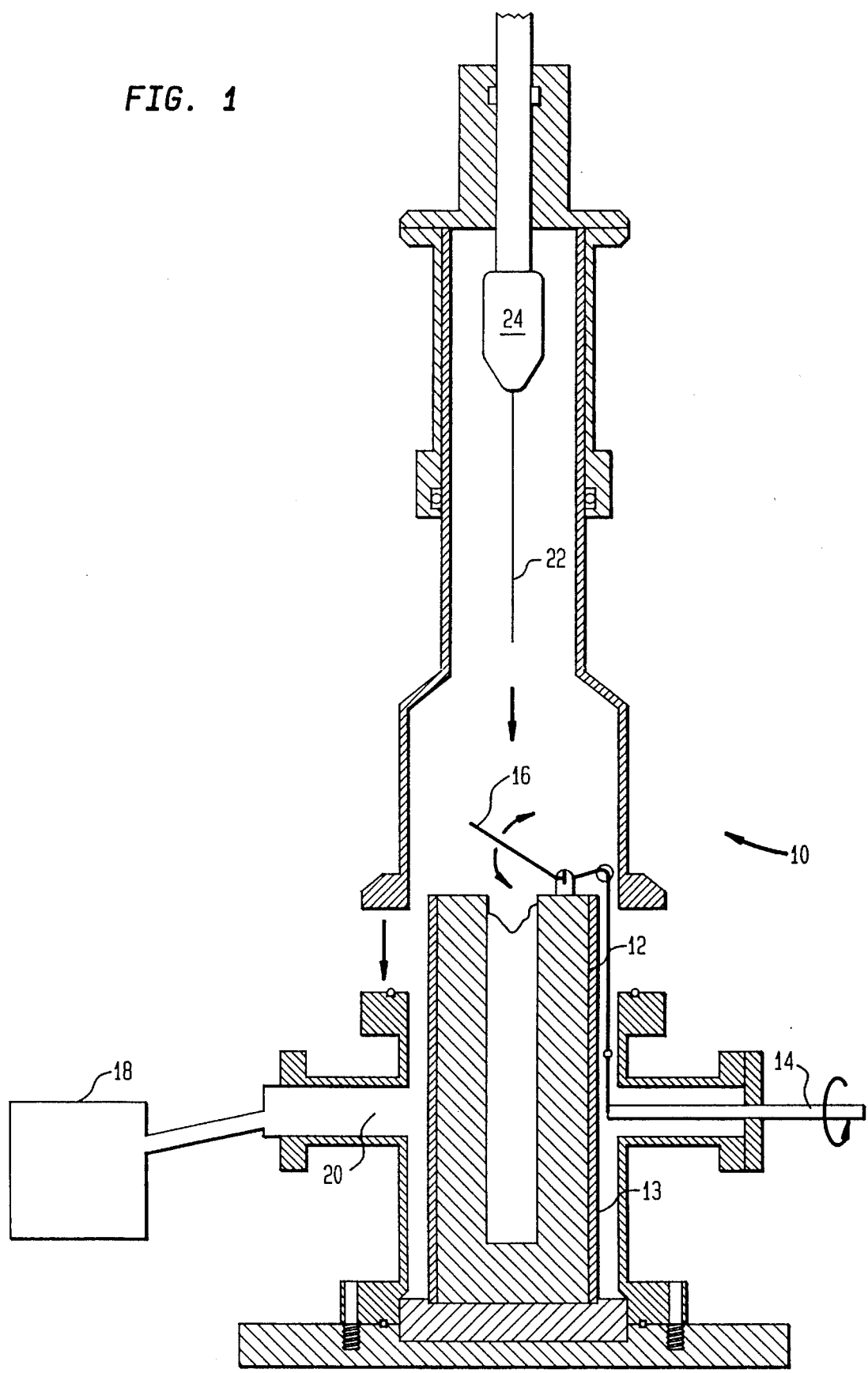
FIG. 1 is a side view in cross-section of a casting apparatus for forming an optical fiber preform in accordance with the present invention.
Figure 1A:
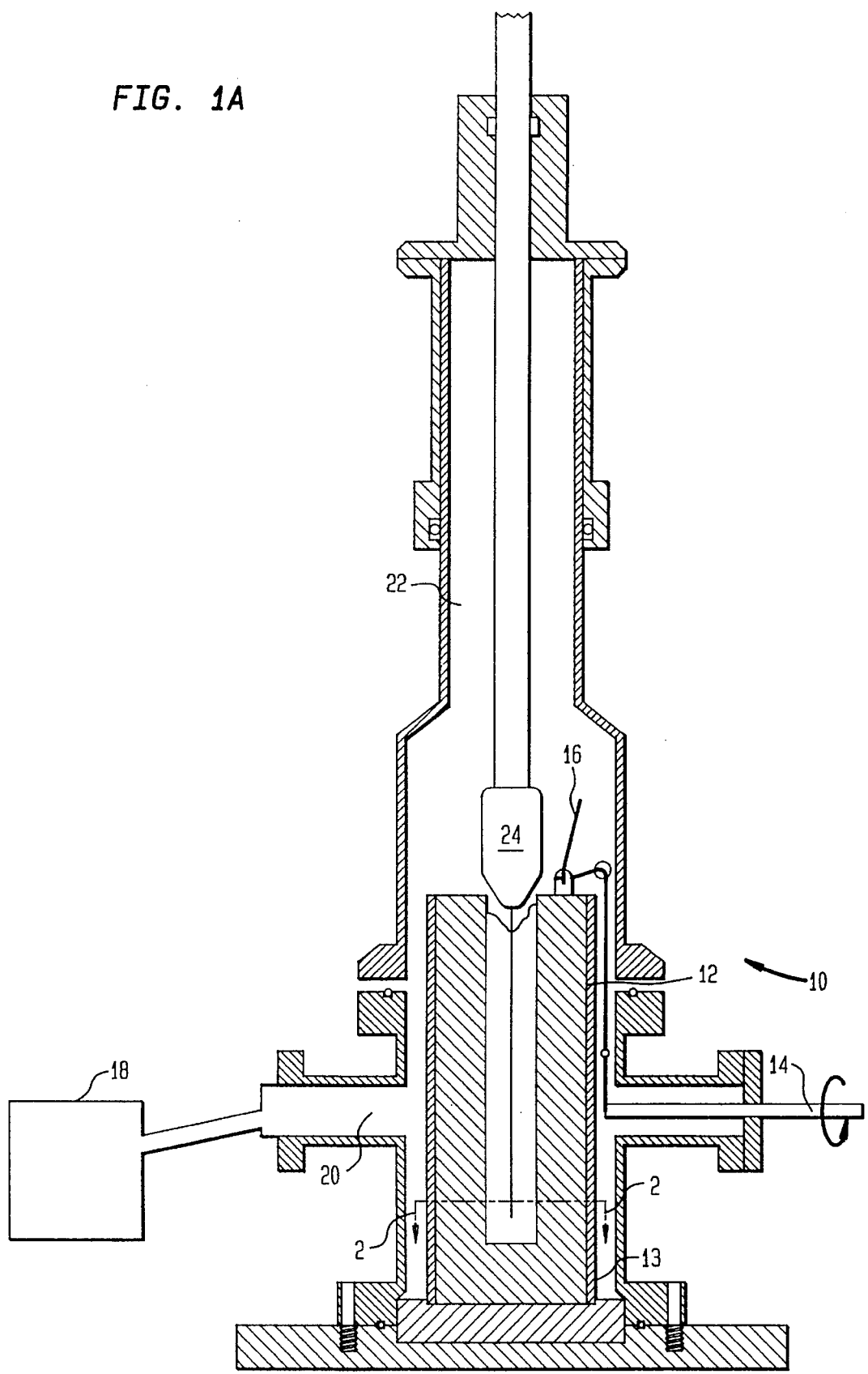
FIG. 1A is a side view in cross-section of a casting apparatus for forming an optical fiber preform wherein a core fiber is introduced into a cladding material in the containment vessel of the casting apparatus housing.

Preforms prepared in accordance with the method described herein include core and cladding materials. The core and cladding materials are preferably composed of glasses, particularly heavy metal nonoxide glasses or oxide glasses. Core and cladding glasses described herein are prepared under dry inert conditions from high purity commercially available reagents. Materials which exhibit a greater viscosity change with temperature are desirable for use in preparing the preforms since they offer a decreased resistance to the inserted core fiber. Glasses comprising silicates, borates, halides, or chalcogenides are useful materials for preparing the preforms. Multicomponent glasses including one or more glass formers such as silica oxide or boron oxide and other metal oxides which are not glass formers can be used to make the preforms. The present invention is not limited to use of any of these particular glasses. Indeed, one skilled in the art can employ various other materials to prepare the preforms in accordance with the method described herein. The core insertion method of the present invention is especially useful for making preforms comprising grossly different core and cladding materials having dissimilar indices of refraction and thermal expansion coefficients. For example, the core fiber may comprise halides and the cladding material may comprise silicate glass.

Particular glass compositions can be combined to achieve larger numerical apertures and vary indices of refraction. The composition of the cladding glass should have a lower index of refraction than that of the core glass. Useful dopants for modifying the refractive indices of the core and cladding glass compositions are LiF, $HfF_4$, $PbF_2$, $AlF_3$ and $BiF_3$. Halide glasses, particularly heavy metal fluoride glasses (HMF), are preferred materials for preparing optical fibers due to their low phonon energy and wide transmission window. HMF glasses are also desirable hosts for rare earth doping since they have a high solubility for rare earth ions.

HMF glasses have narrow working temperature ranges of about 80° to 150° C. between crystallization temperatures ($T_x$) and glass transition temperatures ($T_g$). Preforms comprising HMF glasses produced by conventional casting methods are particularly susceptible to crystallite formation upon the exposure of the glasses to temperatures near or above crystallization temperatures. Thus, the core insertion method described herein is particularly useful for preparing HMF glass preforms. Preferably, the core and cladding glasses comprise fluorozirconates having zirconium fluoride as the predominant component as well as modifiers and stabilizers comprising fluorides of barium, lanthanum, sodium, aluminum, lithium, gadolinium and lead. Examples of suitable fluorozirconate glasses include zirconium-barium-gadolinium fluoride (ZBG), zirconium-barium-gadolinium-aluminum fluoride (ZBGA) and zirconium-barium-lanthanum-aluminum fluoride (ZBLA). A preferred glass for use in fabricating the preforms is ZBLAN glass which is formed by the addition of sodium fluoride to further stabilize ZBLA glass. The most preferred cladding glass for use with this invention is HBLAN glass wherein hafnium tetrafluoride ($HfF_4$) is substituted for zirconium fluoride ($ZrF_4$) to reduce the index of refraction of the ZBLAN glass. The most preferred core glass is ZBLAN glass doped with up to 10% $PbF_2$ to increase the index of refraction. Other useful dopants for modifying the refractive indices of the fluoride glass compositions are LiF, $AlF_3$ and $BiF_3$.

The core and cladding glasses are separately melted, preferably in platinum and vitrous carbon crucibles, at temperatures of about 800° C. in $SF_6$ atmospheres. The core and cladding glasses can then be separately exposed to a dilute oxygen atmosphere to remove carbon particulates from the core and cladding materials. The core glass is cooled to room temperature and drawn into a core fiber using a conventional fiber drawing apparatus such as a fiber draw tower. Alternatively, the core fiber may be pulled directly out of a crucible. Fiber drawing methods are described in *Fluoride Glass Optical Fibers*, P. W. France et al., Blackie CRC Press Inc. pp. 114–116 (1990); *Encyclopedia of Chemical Technology*, John Wiley & Sons, pp. 131–133 (1980) and *Fluoride Glass Fiber Optics*, I. D. Aggarwal and G. Lu, Academic Press, Inc. pp. 227–228 (1991) which are incorporated herein by reference. A core fiber drawn to a diameter of about 50 to about 2000 microns is preferred for use in making a preform to be drawn into a single mode optical fiber. Prior to insertion into the cladding material, the core fiber can be treated, for example, by plasma etching in the presence of a reactive atmosphere, to eliminate imperfections and surface contaminants.

The core fiber can have a circular or non-circular cross-sectional geometry. Examples of non-circular shaped core fibers include square, triangular, elliptical and helical core fibers. At least one core fiber is inserted into the cladding material in accordance with the method described herein. More than one core fiber can be inserted into the cladding material, e.g., ten core fibers can be inserted into the cladding material.

With reference to FIG. 1, cladding glass cooled to about 600° C. to about 700° C. is introduced into the first portion of a casting apparatus housing 10 having a preheated temperature controlled containment vessel 12 disposed therein to form an inner cladding portion and an outer cladding portion in the vessel 12. The vessel 12 is preferably a mold having a cylindrical chamber and a peripheral wall. The cylindrical chamber of the vessel 12 also preferably includes a metallic coating. A heating means 13 associated with vessel 12 is employed to maintain the temperature of the vessel 12 at a constant temperature somewhat less than the glass transition temperature ($T_g$) during the core insertion procedure. Shutter actuator 14 associated with the first portion of housing 10 is rotated to close shutter 16 fixed to a first end of vessel 12 to prevent surface cooling and contamination of the cladding glass. A second portion of the housing 10 is joined to the first portion of the housing 10. A vacuum pump 18 connected to housing outlet 20 can be engaged to form a vacuum in housing 10 to eliminate the formation of bubbles in the preform. A predetermined length of core fiber 22 is inserted in an elongated orientation in the support member 24 disposed in the second portion of housing 10. The shutter actuator 14 is rotated to open shutter 16 and the core fiber 22 is rapidly inserted into the center of the cladding glass in the vessel 12 immediately before the inner cladding material completely solidifies.

Figure 2:
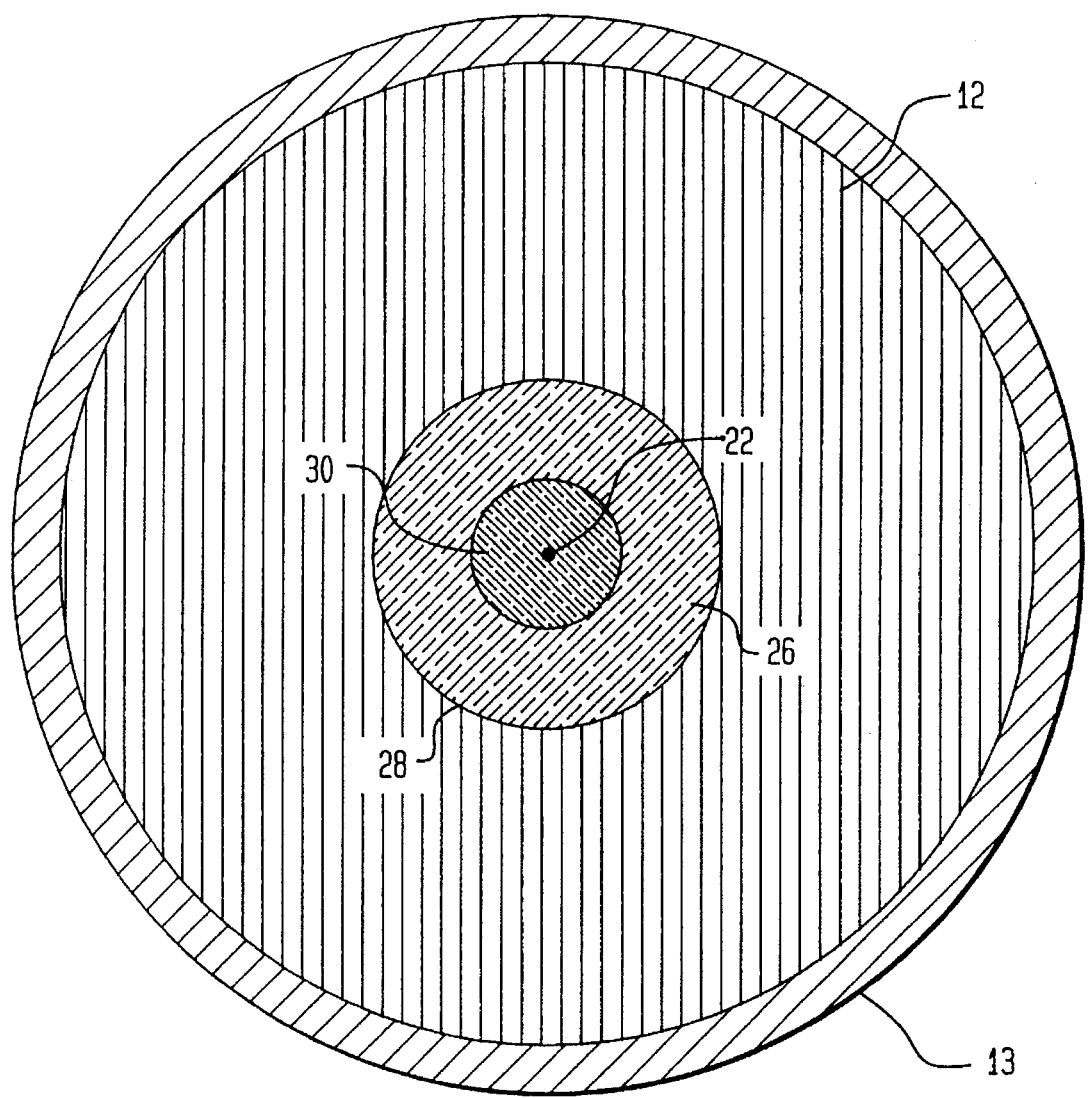
FIG. 2 is a cross-sectional view of the casting apparatus housing taken along lines 2—2 of FIG. 1A illustrating the relationship between the outer and inner portion of the cladding material relative to the core fiber during the formation of the preform.

The temperature of the inner cladding portion at the time of insertion of the core fiber is below the crystallization temperature ($T_x$) and above the glass transition temperature ($T_g$). With reference to FIG. 2, once the cladding material is introduced into the vessel 12, solidification of the cladding material occurs from the outer portion of the cladding material 26 adjacent to the inner wall 28 of the vessel 12 toward the inner portion of the cladding material 30 into which the core fiber 22 is inserted. At the time of insertion of the core fiber, the outer cladding portion 26 is substantially solidified while the inner cladding portion 30 remains in a somewhat molten state. The core insertion should be performed rapidly so that the core fiber does not soften or dissolve during the procedure.

Upon insertion, the temperature of the core fiber increases to somewhat above the glass transition temperature and is then rapidly quenched avoiding bulk crystallization problems. Neither the core fiber nor cladding material are exposed to crystallization temperatures upon insertion of the core fiber into the cladding material. The core fiber is preferably inserted into the cladding material at the lowest possible temperature before the inner cladding portion completely solidifies so that the core fiber is not subjected to an undue amount of thermal stress. Since the temperature of the cladding glass decreases rapidly once it is introduced into vessel 12, for a preform having a diameter of about 14 millimeters the core insertion time ($t_{crr}$) is preferably from about 80 to about 100 seconds after introducing the cladding glass into vessel 12. The core insertion time is greater for making preforms having larger diameters and shorter for making preforms having smaller diameters. Acceptable temperatures for the core fiber at the time of insertion are temperatures below the glass transition temperature. The temperature of the core fiber at the time of insertion is preferably about room temperature. The temperature of the inner cladding portion at the time of insertion of the core fiber is below the crystallization temperature and above the glass transition temperature of the cladding material. The temperature of a fluoride glass cladding material at the time of introducing it into the mold is preferably about 600° C. to about 700° C. For a fluoride glass cladding material, the inner cladding portion is preferably about 15° C. to about 35° C. below the crystallization temperature at the time of insertion of the core fiber. For example, a core fiber should be inserted into a cladding material composed of ZBLAN glass having a crystallization temperature of about 355° C., when the temperature of the inner cladding portion is about 310° C. to about 340° C.

Figure 3A:
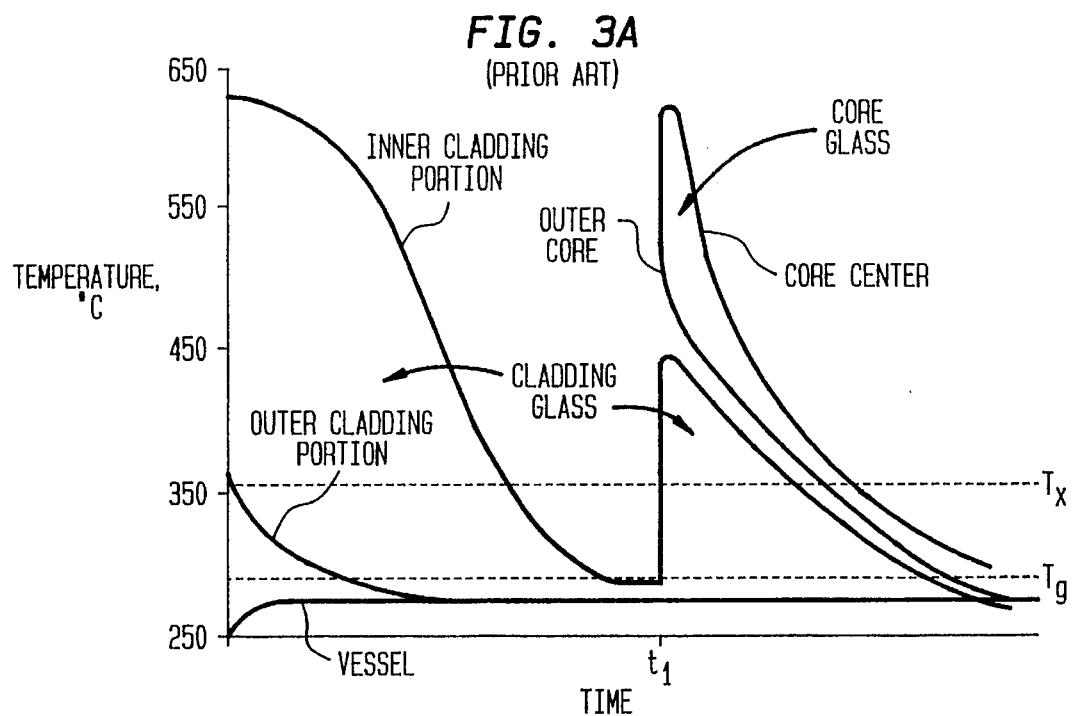
FIG. 3 is a graphic illustration typical of temperatures of the preform casting vessel, core material, and cladding material during a conventional preform casting method of the prior art.
FIG. 3B, is a graphic illustration of typical temperatures of the containment vessel, core fiber and cladding material during a core insertion technique of the present invention.
Figure 3B:
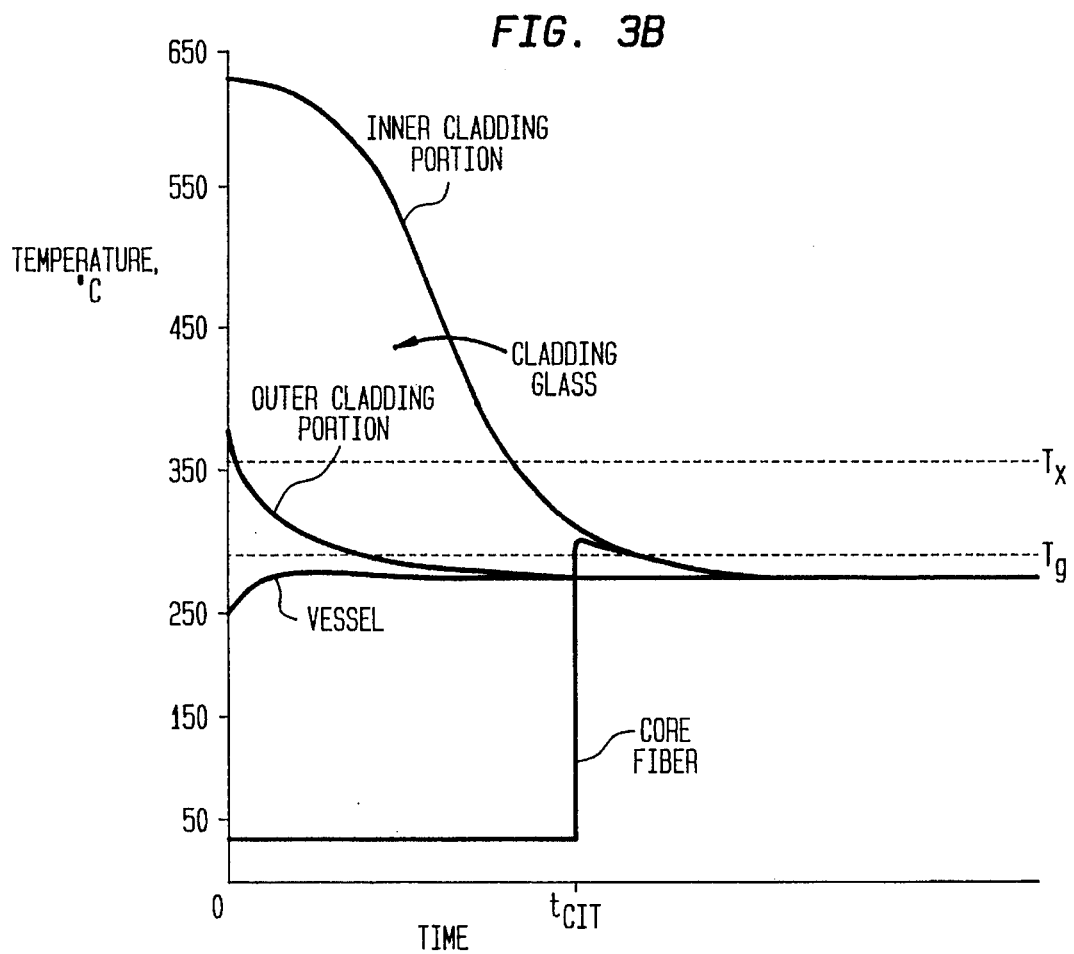

FIG. 3A graphically illustrates typical temperatures of the preform casting vessel, core material and cladding material during a conventional preform casting method of the prior art. In contrast, FIG. 3B graphically illustrates typical temperatures of the containment vessel, core fiber, and cladding material during a core insertion technique of the present invention. The time at which the core melt is introduced to the casting vessel in the conventional method is represented as $t_1$. The time at which the core fiber is inserted into the cladding material in accordance with the present invention is represents as $t_{crr}$.

The apparatus depicted in FIG. 1 is not intended to limit the type of casting apparatus for use in accordance with the present invention to any particular embodiment. One skilled in the art can envision various modifications to the apparatus for performing the core insertion technique described herein. In one embodiment, the preform casting apparatus includes a means associate with the containment vessel for detecting, controlling and displaying the temperature of the cladding material in the containment vessel. In another embodiment, the preform casting apparatus includes a means for automatically inserting said core fiber into said cladding material when the cladding material reaches a desired temperature. In still another embodiment, the apparatus can include a timing means for inserting the core fiber into the cladding material at a predetermined time.

The containment vessel of the casting apparatus can have a circular or non-circular cross-sectional geometry for providing a preform including a cladding material having a circular or non-circular cross-sectional geometry. Furthermore, a preform obtained in accordance with the present invention can be introduced into a second cladding material in accordance with the method described herein. The cladding material of the preform can be reduced in size and/or altered in shape prior to insertion into the second cladding material. The resulting preform having two cladding layers can then be inserted into a third cladding material. Thus, preforms having multiple cladding layers can be obtained in accordance with the method described herein. For example, a preform prepared in accordance with the present invention can include a square inner cladding material surrounding a core fiber and an outer circular cladding material surrounding the inner cladding material.

After the preform is removed from the casting apparatus, it can then be directly drawn into an optical fiber having the desired core and cladding diameters without the need for modification of the preform by additional stretching and jacketing procedures. The optical fiber can be a single mode or multi-mode fiber.

Single mode fibers drawn from the preforms described herein have diameters of about 100 to about 200 microns and have core diameters of about less than 6 microns. Thus, the core diameter of a single mode optical fiber drawn from a preform prepared in accordance with the method described herein comprises about less than 3% to 6% of the diameter of the single mode fiber. The core to clad ratio of a preform prepared in accordance with the present invention is equal to the core to clad ratio of an optical fiber that is drawn from that preform. Thus, the necessary diameter of the core fiber to be inserted into the cladding material disposed in a containment vessel having a predetermined diameter is determined by the desired core to clad ratio of the optical fiber to be drawn from the preform. Core to clad ratios of about 0.005 to about 0.05 are preferred for single mode optical fibers.

For single mode propagation fibers normalized frequency V is less than or equal to 2.401. The normalized frequency parameter describes the relationship of the wavelength of the guided light propagating through the optical fiber core to the refractive indices of the core and the fiber cladding, and is expressed by the formula $$V = (2\pi a/\lambda)(n_{core}^2 - n_{clad}^2)^{1/2}$$

wherein a is the radius of the core of the fiber, $\lambda$ is the wavelength of operation and n is the index of refraction. The numerical aperture of the optical fiber is expressed by the formula $$NA = (n_{core}^2 - n_{clad}^2)^{1/2}$$

Therefore, the necessary diameter of the core of the single mode optical fiber $2a$ can be determined by the formula $2a < (V \times \lambda)/(2\pi \times NA)$. A preferred wavelength of operation for a single mode optical fiber is 1.3 µm. The diameter of the core of a single mode fluoride fiber having a wavelength of operation of 1.3 µm must be less than 6 microns. Smaller diameter core fibers and larger diameter cladding molds can be employed to make preforms for fabricating optical fibers having greater numerical apertures and/or shorter wavelengths of operation.

The optical fibers drawn from the preforms of the present invention can be examined under an interference microscope to inspect the core-clad interfaces of the optical fibers. Interference microscopy reveals that optical fibers drawn from preforms prepared in accordance with the core insertion method of the present invention have high quality core-clad interfaces that are free of crystallites.

The following examples are illustrative of the core insertion method, preforms, and optical fibers of the present invention.

EXAMPLE 1

Preparation of Core Glass and Core Fiber

ZBLAN core glass composed of $ZrF_4$ (53 mole %), $BaF_2$ (20 mole %), LaF (4 mole %) and NaF (20 mole %) doped with 10% $PbF_2$ to increase the index of refraction was prepared from high purity commercially available materials in a glove box under argon atmosphere. The core glass was melted in a platinum and vitrous carbon crucible at 800° C. in a $SF_6$ atmosphere and then exposed to a dilute oxygen atmosphere. The molten glass was cooled to 600° C. before pouring it into a gold coated brass mold. The core glass was then cooled to room temperature, removed from the mold, mounted on a fiber draw tower and pulled into a core fiber having a diameter of 500 microns. The core fiber was then cut to a length of 10 centimeters.

EXAMPLE 2

Preparation of the Cladding Glass

HBLAN glass composed of $HfF_4$ (53 mole %), $BaF_2$ (20 mole %), LaF (4 mole %), and NaF (20 mole %) was prepared from high purity commercially available powder materials in a glove box under argon atmosphere. The cladding glass was melted in a platinum and vitrous carbon crucible at 800° C. in a $SF_6$ atmosphere and then exposed to a dilute oxygen atmosphere. The molten cladding glass was cooled to 600° C. and then poured into the preheated (250° C.) gold coated brass containment vessel (having a diameter of 14 millimeters) of the preform casting apparatus. The shutter located on the first end of the containment vessel was closed to protect the cladding glass from contamination, and surface cooling. A vacuum was formed in the casting apparatus housing to prevent the formation of argon bubbles in the cladding glass during insertion of the core fiber.

EXAMPLE 3

Insertion of the Core Fiber to Obtain the Preform

The core fiber of Example 1 having a temperature of 25° C. was placed in the support member of the casting apparatus. The core fiber was rapidly inserted into the cladding glass of Example 2 100 seconds after the cladding glass was poured into the preform casting containment vessel. The temperature of the inner cladding layer at the time of insertion of the core fiber was 320° C. The temperature of the mold was held at 260° C. during the insertion procedure. After insertion of the core fiber, the temperature of the preform decreased to room temperature and was then removed from the casting apparatus.

The preform was drawn into a single mode fiber and inspected under an interference microscope. The preform exhibited annular interference fringes indicating that the core-clad inter/ace was free of crystallites.

Other modifications and variations of the present invention are possible in light of the above teachings. It is therefore, to be understood that changes may be made in particular embodiments of the invention described which are within the full intended scope of the invention as defined by the claims.

What is claimed is:

1. A method of making an optical fiber preform comprising the steps of:
   a) introducing a molten cladding material into a containment vessel having a peripheral wall;
   b) permitting an outer portion of the molten cladding material to substantially solidify; and
   c) inserting at least one core fiber into an inner portion of the molten cladding material to form an optical fiber preform.

2. A method according to claim 1, wherein the step of inserting said core fiber into said cladding material is performed under vacuum or inert atmosphere.

3. A method according to claim 1, further comprising the step of forming an additional cladding layer on said optical fiber preform by introducing said optical fiber preform into a further molten cladding material and allowing said further molten cladding material to solidify to form said additional cladding layer.

4. A method according to claim 1, wherein said core fiber and said cladding material comprise glasses selected from the group consisting of silicates, borates, chalcogenides and halides.

5. A method according to claim 1, wherein said core fiber comprises heavy metal halide glass and said cladding material comprises heavy metal halide glass.

6. A method according to claim 5, wherein said heavy metal halide glass is a heavy metal fluoride glass.

7. A method according to claim 6, wherein said fluoride glass is a multicomponent glass selected from the group consisting of ZBL, ZBA, ZBLA, ZBGA, ZBLAN, HBLA and HBLAN.

8. A method according to claim 6, wherein the step of inserting the core fiber into said cladding material is performed within a time interval between about 80 seconds to about 110 seconds after the step of introducing said cladding material into said containment vessel.

9. A method according to claim 6, wherein the step of inserting the core fiber into said cladding material is performed about 100 seconds after the step of introducing the cladding material into said containment vessel.

10. A method according to claim 1, wherein said core fiber comprises ZBLAN glass doped with $PbF_2$ and said cladding material comprises HBLAN glass.

11. A method according to claim 1, wherein the diameter of said core fiber is frown about 50 microns to about 2000 microns.

12. A method according to claim 1 wherein the diameter of said core fiber is less than about 500 microns.

13. A method according to claim 1, wherein said preform has a core to clad ratio of about 0.005 to about 0.05.

14. A method according to claim 1, wherein the temperature of the core fiber is about less than the glass transition temperature of the core fiber at the time of the inserting of said core fiber into said cladding material.

15. A method according to claim 1, wherein the temperature of said cladding material is from about 600° to about 700° C. at the time of the introducing of the cladding material into said containment vessel.

16. A method according to claim 1, wherein the step of inserting said core fiber into said cladding material is performed at a time when the temperature of the inner peripheral portion of the cladding material is below a crystallization temperature of said cladding material and above a glass transition temperature of said cladding material.

17. A method according to claim 1, wherein the temperature of the inner portion of the cladding material is from about 310° C. to about 340° C. at the time of the inserting of said core fiber into said cladding material.

18. A method according to claim 1, wherein the step of inserting the core fiber into the cladding material is performed when the temperature of the inner peripheral portion of the cladding material is from about 15° C. to about 35° C. below a crystallization temperature of said cladding material.

19. A method of making an optical fiber comprising the steps of:

a) introducing a molten cladding material into a containment vessel having a peripheral wall;

b) permitting an outer portion of the molten cladding material to substantially solidify;

c) inserting a core fiber into an inner portion of the molten cladding material to form an optical fiber preform; and d) drawing said preform into an optical fiber.

20. A method according to claim 19, further comprising the step of applying a coating to said optical fiber.

21. A method according to claim 19, wherein said optical fiber comprises a single mode optical fiber.

* * * * *